United States Patent Office 2,714,538
Patented Aug. 2, 1955

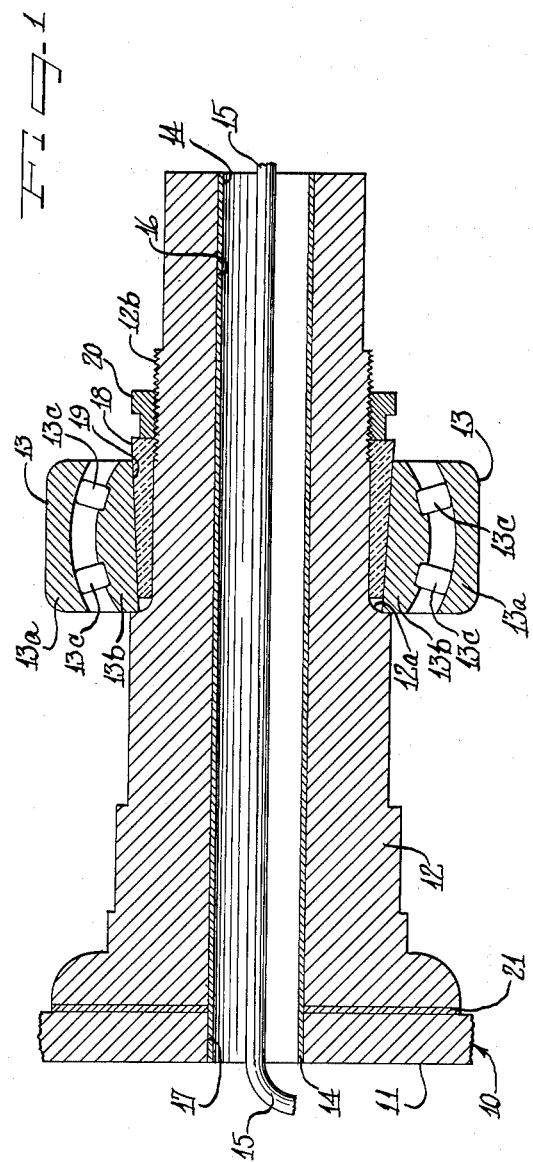

2,714,538

INSULATING SLEEVE FOR DRYER BEARINGS

Lloyd Hornbostel, Beloit, Wis., assignor to Beloit Iron Works, Beloit, Wis., a corporation of Wisconsin Application September 11, 1952, Serial No. 309,016

5 Claims. (Cl. 308—77)

My invention relates to the cooling of bearings to prevent mechanical failure and decomposition of lubricants, and more particularly, to the cooling of bearings for drier drums such as are used on paper machines to dry the paper.

The bearings of such drier drums are subjected to high temperatures caused by feeding steam or other heating means into the drum. It should be understood, however, that the cooled bearing means of this invention are not limited to use on drier drums, but may be used on any bearing arrangements which are subjected to elevated temperatures.

It is known that when a shaft, journal or trunnion, which is rotatably mounted in a bearing, becomes rapidly heated, the same will expand faster than the bearing. This expansion will subject the bearing to great stresses which, in many cases, will rupture the races of the bearings. When roller bearings are used to mount the shaft or trunnion, a rapid heating of the shaft or trunnion will cause the same to expand faster than the bearing inner race and will cause this race to break or expand so as to jam the rollers. These bearing breakages and expansions are very serious drawbacks in the operation of paper machine drier drums, since it is vitally important that the drier drum journals and bearings be kept in good shape to maintain a uniform draw of the paper web as it passes from one drum to another.

When the drier drum journals are not cooled, the bearings will run at very high temperatures due to heat transfer from the steam passed through the journals and to heat of friction. This creates a fire hazard as there is, ordinarily, sufficient paper or paper dust around the bearings which might be ignited by the hot bearings. Furthermore, heating of the bearings tends to decrease the lubricating efficiency of oils or greases which might be packed in the bearings and thereby causes great frictional wear between the bearing parts.

In United States Patent No. 2,173,225, issued on September 19, 1939, to Earl E. Berry and Lloyd Hornbostel, there is described and claimed certain air cooled journal bearing arrangements in which air is caused to flow through a hollow journal by fan devices provided on both ends of the journal which scoop up air surrounding the end of the journal and throw out the heated air passing through the journal. This provides a simple mechanism for maintaining the bearing cool by flowing the cooling fluid, such as air, through the journal mounted in the bearing.

The instant invention provides an improved and simplified arrangement, which may be used in place of or in conjunction with the air cooling arrangement of Patent No. 2,173,225.

It is, therefore, an important object of the instant invention to provide an improved cooled journal bearing.

It is another object of the instant invention to provide a journal-bearing structure for heated drier drums, comprising a shaft having a passageway therethrough, means for circulating cooling air through said passageway, bearing means surrounding the shaft for rotatably supporting the same, and insulating means interposed between said shaft and said bearing means for maintaining spaced relation therebetween.

It is still a further object of the instant invention to provide a journal-bearing structure for heated drier drums, comprising a shaft having a passageway therethrough, a load-receiving slightly resilient porous metal insulating sleeve mounted surroundingly of said shaft, and bearing means separated from said shaft by said sleeve and mounted thereon for rotatably supporting said shaft.

Yet another important object of the instant invention is to provide a drier drum assembly comprising a hollow drier drum having a cylindrical periphery and side walls, front and rear journals projecting from the central portion of the side walls of the drum, said rear journal affording communication therethrough to the drum interior to permit introduction of steam into the drum interior, bearings for rotatably supporting said journals, and insulating sleeves interposed between said bearings and supporting journals.

Other and further objects and advantages of the instant invention will become apparent to those skilled in the art from the following detailed description of the annexed sheets of drawings which disclose preferred embodiments of the invention.

On the drawings:

Figure 1 is a sectional elevational view of a journal-bearing arrangement embodying the instant invention;

Figure 2 is a fragmentary enlarged sectional view showing details of a preferred embodiment of the instant invention;

Figure 3 is a fragmentary enlarged sectional view showing details of still another embodiment of the instant invention; and Figure 4 is an enlarged fragmentary detail sectional view of still another embodiment of my invention.

As shown on the drawings:

In Figure 1, the reference numeral 10 indicates generally a rear journal-bearing arrangement for use with a drier drum, only the rear end wall 11 of which is shown fragmentarily in Figure 1. As is shown in more detail in Patent No. 2,173,225, the drier drum has a front journal and a rear journal for rotatably supporting the same, the front journal being suitably affixed to the closed front end wall of the drier drum, whereas the rear journal is suitably affixed to the apertured rear end wall of the drier drum, so that steam may be introduced through the rear journal and into the interior of the drier drum.

The instant invention is applicable for use with either a front journal or a rear journal, or both. As shown in Figure 1, the use of the instant invention on a rear journal-bearing assembly 10 will be described.

As shown in Figure 1, the rear journal 12 rotatably supports the drum and is secured to the rear end wall 11 of the drum by bolts or the like securing means (not shown). The rear journal 12 is rotatably mounted in a bearing 13, in this case shown as a roller bearing 13 having an outer race 13a, an inner race 13b and suitable rollers 13c mounted therebetween. It will, of course, be appreciated that other bearing means, such as plain bearings (on the bottom half only or surrounding the trunnion 12) may be employed instead of the specific bearing 13 here shown; and the various oil-sealing and retaining devices ordinarily employed with bearings may be used. Such arrangements are well known to those skilled in the art, and do not of themselves form a part of this invention, so it is not necessary to describe them in further detail herein.

As is customary on drier drums, the rear journal 12 thereof is coupled with a steam header 14 for supplying the interior of the drier drum with live steam from a suitable steam source (not shown). The header 14 also contains a condensate tube 15 for removing the condensed steam from the interior of the drier drum for discharge into a suitable drain line (not shown). As shown in Figure 1, the rear journal 12 is hollow, having a passageway 16 extending therethrough and aligned with the aperture 17 in the end wall 11. The steam header 14 extends through the passageway 16 and the aperture 17, for the purpose of conducting live steam into the drier drum, and the condensate line 15 extends from the interior of the drier drum through the aperture 17 in the passageway 16, concentrically positioned therein and within the steam header 14, for the purpose of removing condensate from the drum interior.

It will thus be seen that, in the embodiment of Figure 1, the live steam in the steam header 14 will heat the header 14, which in turn will heat the trunnion 12. Ordinarily, the metal header 14 and the metal trunnion or journal 12 will act as good heat conductors, tending to effectively conduct heat outwardly to the bearing 13. In my invention, however, I provide means for effectively reducing the rate at which heat is conducted from the live steam within the steam header 14 to the bearing 13, of the journal 12.

The means which I provide include a sleeve 18 made of insulating material and interposed between the bearing 13 and the journal 12. The sleeve 18 is tapered slightly and it is adapted for axial movement upon the trunnion 12 which it surrounds. The inner face 19 of the inner bearing race 13b is correspondingly tapered to cooperate with the tapered sleeve 18, to permit adjustment therebetween to obtain the necessary tight fit. As will be understood, the inner bearing race 13b is prevented from axial movement in the direction of the drier drum by the shoulder 12a on the journal 12; and the wedge-like tapered collar or sleeve 18 may be driven axially toward the drier drum (between the journal 12 and the bearing inner race 13b) by means of the threaded collar 20 which cooperates with the threaded portion 12b of the journal 12. It will thus be seen that, by rotation of the threaded collar 20 the insulating sleeve 18 may be forced into position so as to secure the mounting of the bearing 13 and to maintain the bearing 13 in spaced relation from the journal 12 (with the exception of the very slight surface contact between the bearing 13 and the journal 12 at the shoulder 12a). The sleeve 18 may be made of any of a number of insulating materials which are sufficiently incompressible to carry the load applied thereto without collapsing during normal operation. Although such load-receiving material may be substantially incompressible with respect to the load (in weight of drier drum and the like equipment) which it must receive, it is preferably not so rigid or incompressible that it cannot "give" a little in response to the expansion and contraction forces generated within itself and within the journal 12 by temperature changes. In other words, a certain small amount of resilience in the sleeve 18 is most preferable so that the outward radial force exerted by the journal 12 during heat-up will be dissipated within the body of the sleeve 18 and will not be transmitted fully to the inner face 19 of the inner bearing race 13b. Such resilience may also be incorporated in the threaded collar 20 or in a spacer (not shown) between the collar 20 and the sleeve 18, so as to permit limited outward axial movement of the wedge-like sleeve 18 to relieve excessive pressure against the face 19 of the inner bearing race 13b.

The materials which I prefer to use include "eelslip" and the like insulators, and most preferably, porous or grooved metal sleeves. Such metal sleeves should preferably have a sufficient amount of metal removed or absent from the body thereof (as in pores, grooves, threads or the like) to reduce the average conducting cross-sectional area by at least about 20 percent, and preferably at least about 50 percent. The metal sleeves may thus have internal pores or hollowed spaces, or the sleeves may have inner and/or outer surfaces with opened pores, grooves or threads therein which materially reduce the area of the surface-to-surface contact between the sleeve 18 and the bearing 13 and/or the journal 12. Such metal sleeves should not, of course have so much metal removed therefrom that they are no longer suitable load-receiving materials for the equipment used; but the removal of substantial proportions such as 50–60 volume percent tends to impart to the metal sleeves the slight resilience necessary to permit the sleeve 18 to "give" a little instead of rupturing or deforming the bearing inner race 13b during heat-up of the journal 12.

A particularly advantageous aspect of the instant invention resides in the fact that the insulator 18 here used is directly adjacent to the bearing 13, so that all other means of dissipating heat which might tend to be conducted to the bearing 13 are advantageously used. In other words, by interposing the insulator 18 between the bearing 13 and the journal 12, it is possible to permit the journal to become heated to a relatively high temperature and to dissipate this heat to the atmosphere by radiation and convection in a most convenient manner. The relatively large outside surface of the journal 12, which is exposed to the atmosphere (the insulator sleeve 18 being substantially coextensive with or having the same axial length as the bearing 13), affords a particularly advantageous means for the dissipation of heat. It will be appreciated that, if the bearing 13 and the journal 12 were not insulated from each other, as here shown, it would be necessary to maintain the journal 12 at a substantially lower operating temperature than is here used in order to operate the bearing 13 at a given relatively cool temperature. Maintenance of the journal 12 at such relatively lower temperature, however, results in a substantially lower temperature differential between the journal 12 and the atmosphere, and thus a substantially lower rate of total heat loss from the outer surface of the journal 12 to the atmosphere.

On the other hand, it will be appreciated that there is at least some heat transfer across the sleeve 18, depending upon the particular material employed therein, and the rate of such heat transfer is also dependent upon the temperature differential or gradient across the sleeve 18. Thus, if very high journal temperatures are employed a correspondingly greater amount of heat will be transferred or conducted through the sleeve 18 to the inner bearing race 13b. Another particularly advantageous aspect of my invention resides in the fact that I may employ insulators at two or more locations in the journal-bearing arrangement 10, so that I may take maximum advantage of the dissipation of heat at the outer surface of the journal 12 and also maintain a desired operating temperature for the bearing 13.

For example, the substantially greater internal surface of the drier drum exposed to live steam causes the drier drum to operate at a substantially greater temperature than would oridinarily result in the journal 12. I, therefore, find that it is particularly advantageous in the practice of my invention to employ an insulating gasket 21 between the drum endwall 11 and the journal 12, so as to minimize the heat transfer by conduction from the heated drier endwall 11 and the journal 12, so as to minimize the heat transfer by conduction from the heated drier endwall 11 to the journal 12. Also, I find that it is particularly preferable to employ insulating means between the journal 12 and the live steam in the journal passageway 16, such means being in the form of a steam header 14 of insulating material, an insulating wrap or cover (not shown) upon the steam header 14, an air space between the header 14 and the inside walls of the passageway 16, or the like.

Referring now to Figure 2, which is a fragmentary detail view, showing a journal 22 (showing only the top portion thereof) and an inner bearing race 23 (showing only the bottom portion thereof) having interposed therebetween a tapered, wedge-like sleeve 24. As shown in Figure 2, the sleeve 24 functions substantially as the sleeve 18 of Figure 1, and it is made of metal having a plurality of grooves 25 in the surface thereof contacting the inner bearing race 23, and a plurality of grooves 26 in the surface thereof contacting the outside surface of the journal 22. As will be appreciated, the grooves 25 and 26 effect a material reduction (of about 25 volume percent) in the total amount of metal within the body of the sleeve 24, so as to materially reduce the rate at which heat will be conducted through the sleeve 24. Also, the grooves 25 and 26 materially reduce the total area of surface-to-surface contact between the sleeve 24 and the journal 22 and/or the inner bearing race 23, thereby effectively reducing the rate at which heat may be conducted past these two surfaces.

Another advantageous aspect of the present arrangement for controlling the conduction of heat toward the bearing is shown in Figure 2. As will be seen, the steam header 27 (only the top portion of which is shown) is spaced from the inside wall of the journal 22, so as to define an air space 28 which will, of course, effectively reduce the rate at which heat is conducted from the walls of the header 27 to the walls of the journal 22. This particular type of insulating arrangement is brought out in detail in Patent No. 2,173,225, and need not be elaborated upon herein. The instant invention does not reside in the use of the insulating air gap 28 alone for the purpose of controlling heat conduction in this particular arrangement. Instead, the instant invention, as it relates to this particular insulating arrangement, provides a unique combination of insulating means whereby the inner bearing race 23 is maintained at the desired operating temperature by the use of, first, the insulating sleeve 24 and, secondly, an insulator such as the insulating air gap 28. The secondary insulator 28 is used to effectively maintain the journal 22 at a temperature which is suitable for effective operation of the insulating sleeve 24, but which also is suitable for obtaining maximum dissipation of heat from the outer surface of the journal 22 to the atmosphere, as hereinbefore described.

Still another secondary insulating means is shown in Figure 3, wherein a journal 29 and an inner bearing race 30 have interposed therebetween an insulating sleeve 31, which will be described in detail hereinafter. In Figure 3, the steam header 32 is provided with a concentric covering pipe 33 which is spaced outwardly a slight distance from the steam header 32, so as to define an air space therebetween. Preferably, such air space is sealed or filled with a suitable insulating material (not shown), in accordance with the teachings of Patent No. 2,173,225, so that this space 34 may serve as an effective insulator. The additional space 35 between the walls of the journal 29 and the outer walls of the covering pipe 33 may also function as an insulator or, like the space 28 of Figure 2, the space 35 may be employed for the circulation of cooling air in accordance with the teachings of Patent No. 2,173,225.

Suitable means for circulating cooling air through passageways within a journal (such as the passageway 28 of Figure 2 and the passageway 35 of Figure 3) are shown fragmentarily in Figure 4. As shown in Figure 4, such means comprise an air scoop 36 suitably mounted upon the journal 37 and adapted to rotate therewith, with the scoop, or open end of the elbow fitting 36 facing in the direction of rotation, so as to pick up air during such rotation. The elbow 36 is threadedly engaged in a passageway 38 in the journal 37, which leads to the interior 39 of the journal 37. Also, as shown in Figure 4, the interior 39 of the journal 37 contains no steam conduit or drain, since the journal 37 is a front journal, which it will be appreciated is equally suitable for use with the instant journal-bearing arrangement. The air scoop 36 picks up cooling air during rotation of the journal 37, causing the air to pass thereinto through the passage 38 and then through the interior 39 of the journal 37 to a suitable outlet, again, in accordance with the teachings of Patent No. 2,173,225. It will also be appreciated that the rate at which cooling air is picked up by the air scoop 36 may be controlled, for example, by turning the elbow fitting 36 at various angles with respect to the plane in which the elbow 36 moves during rotation of the journal 37. In this manner, it is possible to obtain still an additional control of the journal operating temperature which the instant invention makes independent of the bearing operating temperature, in view of the insulating sleeve mounting for the bearing.

It will thus be seen that the instant invention provides for a unique control of the heat dissipation, through conduction or otherwise at the drier drum journal by means of the primary insulator in the form of an insulating sleeve mounting for the bearing, which may be used in conjunction with one or more insulating and/or cooling means associated with the journal itself.

Referring again to Figure 3, it will be seen that the insulating sleeve 31 is a tapered sleeve which may function in many respects much as the tapered sleeve 18 of Figure 1 functions, but which is substantially hollow, having a plurality of hollow chambers 40 within the body thereof. Such hollow chambers 40 effectively reduce the total metal volume of the body (about 50–60 volume percent), so as to correspondingly reduce the overall average conducting cross-sectional area of the sleeve 31. This structure avoids the use of irregularities upon the inner and outer working surfaces of the sleeve 31, which in many instances may be advantageous, although it results in an insulating effect by materially reducing the ability of the sleeve 31 to conduct heat. In addition, the sleeve 31 is suitably strong to receive the operating load, but during heating and cooling thereof, as well as heating and cooling of the journal 29, the sleeve 31 tends to dissipate the very great expansion and contracting forces so generated, so that such forces are not applied totally as radial or stretching forces against the inside wall of the inner bearing race 30. As hereinbefore mentioned, this is a very important consideration in the instant arrangement, and this particular arrangement provides additional flexibility with respect to this problem, since the secondary insulating and/or cooling means herein described may be employed to control to an appreciable extent the temperature of the journal 29 and thereby to control the expansion and contraction forces generated during heating and cooling.

Referring again to Figure 4, it will be seen that the structure there shown includes the journal 37 having surroundingly mounted thereon an insulating sleeve 40. A suitable bearing assembly 41, comprising an outer bearing race 41a, an inner bearing race 41b and suitable rollers 41c is mounted upon the sleeve 40. In general, the cooperation between the journal 37, sleeve 40 and bearing 41 is substantially the same as that hereinbefore described. In this case, the sleeve 40 is not tapered, thereby not providing certain of the advantages hereinbefore mentioned in connection with tapered sleeves, but the untapered sleeve 40 does not require any particular mating taper upon the inner surface of the inner bearing race 49b. It will also be noticed that the sleeve 40 is grooved only on the outer surface thereof, although the grooves 42 are relatively deep, so as to effect the removal of a substantial volume percent of the metal body 40, thereby reducing its effectiveness as a heat conductor. The sleeve 40 is shown so as to point out that the grooves 42 may be formed on only one side of the sleeve 40, if desired. Also, it will be appreciated that additional locking means (not shown) may be employed in the structure of Figure 4 in order to suitably fix the position of the sleeve 40 and the bearing 41 mounted thereon, and such locking means are preferably equipped with the necessary insulating gaskets or the like to effectively prevent conduction of the heat from the journal 37 through such means to the bearing 41.

It will be understood that modifications and variations may be effected without departing from the scope of the novel concepts of the present invention.

I claim as my invention:

1. A journal-bearing structure for heated drier drums, comprising a shaft having a passageway therethrough, means for circulating cooling air through said passageway, bearing means surrounding the shaft for rotatably supporting the same, and insulating means substantially coextensive with the bearing means interposed between said shaft and said bearing means for maintaining spaced relation therebetween, while permitting a substantial portion of the shaft to be exposed to the atmosphere.

2. A journal-bearing structure for heated drier drums, comprising a shaft having a passageway therethrough, an insulating gasket for mounting said shaft on a drum endwall, means for circulating cooling air through said passageway, bearing means surrounding the shaft for rotatably supporting the same, and insulating means substantially coextensive with the bearing means interposed between said shaft and said bearing means for maintaining spaced relation therebetween, while permitting a substantial portion of the shaft to be exposed to the atmosphere.

3. A journal-bearing structure for heated drier drums, comprising a shaft having a passageway therethrough, a porous metal insulating sleeve mounted surroundingly of said shaft, and bearing means separated from said shaft by said sleeve and mounted thereon for rotatably supporting said shaft, said porous metal sleeve being resiliently yieldable to thermal-induced expansion and contraction forces generated in said shaft and said bearing means during operation of said structure.

4. A journal-bearing structure for heated drums, comprising a shaft having a passageway therethrough, a metal sleeve grooved to reduce the average conducting cross-sectional area by at least 20 percent on said shaft, and bearing means separated from said shaft by said sleeve and mounted thereon for rotatably supporting said shaft, said metal sleeve being substantially coextensive with the bearing means.

5. A journal-bearing structure for heated drier drums, comprising a shaft having a passageway therethrough, a load-receiving slightly resilient porous metal insulating sleeve mounted surroundingly of said shaft, and bearing means separated from said shaft by said sleeve and mounted thereon for rotatably supporting said shaft, said sleeve extending on said shaft substantially the axial length of said bearing means and exposing the remainder of the shaft to the atmosphere.

References Cited in the file of this patent

UNITED STATES PATENTS

| | | |
|---|---|---|
| 1,699,330 | Gayman | Jan. 15, 1929 |
| 2,017,762 | Lord | Oct. 15, 1935 |
| 2,173,225 | Berry et al. | Sept. 19, 1939 |
| 2,413,567 | Hornbostel | Dec. 31, 1946 |
| 2,439,127 | Dailey, Jr., et al. | Apr. 6, 1948 |

FOREIGN PATENTS

| | | |
|---|---|---|
| 336,914 | Great Britain | Oct. 23, 1930 |